United States Patent [19]

Close et al.

[11] Patent Number: 5,774,951
[45] Date of Patent: Jul. 7, 1998

[54] CLAMP

[75] Inventors: Brian Close, Fairlight; Bruce Hart, Terrey Hills, both of Australia

[73] Assignee: Flexible Steel Lacing Company, Downers Grove, Ill.

[21] Appl. No.: 351,295

[22] PCT Filed: Jun. 11, 1993

[86] PCT No.: PCT/AU93/00278

§ 371 Date: Apr. 10, 1994

§ 102(e) Date: Apr. 10, 1994

[87] PCT Pub. No.: WO94/00697

PCT Pub. Date: Jan. 6, 1994

[30] Foreign Application Priority Data

Jun. 30, 1992 [GB] United Kingdom ........... 9213858

[51] Int. Cl.$^6$ ................ A44B 21/00; B65G 47/00
[52] U.S. Cl. ................ 24/568; 24/522; 24/571; 198/836.1
[58] Field of Search ............ 24/568, 522, 571; 198/836.1

[56] References Cited

U.S. PATENT DOCUMENTS

| Re. 31,249 | 5/1983 | Stahura | 198/525 |
|---|---|---|---|
| 2,488,980 | 11/1949 | Madeira | 198/52 |
| 2,665,795 | 1/1954 | Holwick | 198/204 |
| 2,675,593 | 4/1954 | Okell | 24/522 |
| 2,685,958 | 8/1954 | White, Jr. | 198/204 |
| 2,745,541 | 5/1956 | Hofstatter | 198/184 |
| 2,883,035 | 4/1959 | Erisman | 198/56 |
| 3,024,893 | 3/1962 | Lambert | 198/204 |
| 3,253,305 | 5/1966 | Granath | 22/36 |
| 3,344,909 | 10/1967 | Hansen et al. | 198/204 |
| 3,499,523 | 3/1970 | Clegg | 198/204 |
| 3,989,137 | 11/1976 | Ward | 198/836 |
| 4,204,595 | 5/1980 | Marrs | 198/836 |
| 4,231,471 | 11/1980 | Gordon | 198/836 |
| 4,436,446 | 3/1984 | Gordon | 403/384 |
| 4,508,479 | 4/1985 | Mez | 411/340 |
| 4,641,745 | 2/1987 | Skates | 198/836 |
| 4,874,082 | 10/1989 | Swinderman | 198/836 |
| 4,877,125 | 10/1989 | Gordon | 198/836 |
| 4,989,727 | 2/1991 | Gordon | 198/836.1 |
| 5,048,669 | 9/1991 | Swinderman | 198/525 |
| 5,129,508 | 7/1992 | Shelstad | 198/860.3 |
| 5,154,280 | 10/1992 | Mott | 198/525 |

FOREIGN PATENT DOCUMENTS

| 61328/73 | 4/1975 | Australia. |
| 594578 | 3/1934 | Germany. |
| 1256691 | 12/1971 | United Kingdom. |
| 2087337 | 5/1982 | United Kingdom. |
| 2089415 | 6/1982 | United Kingdom. |
| 2230815 | 10/1990 | United Kingdom. |

*Primary Examiner*—Victor N. Sakran
*Attorney, Agent, or Firm*—Fitch, Even, Tabin & Flannery

[57] ABSTRACT

A clamping apparatus for adjustably clamping a flexible skirt to a conveyor belt skirt plate comprises a locking member adapted to be driven along a stationary cam member in the form of a pin to exert a force on a clamp plate that has one side abutting the flexible skirt and forcing the skirt against the conveyor belt skirt plate. The locking member has a closed, elongated slot to retain the locking member on the cam pin. The locking member may be pivoted outwardly on the pin to project normal to the clamping plate, which has an aligned bore allowing removal of the clamp plate for installation of a flexible skirt. The cam pin is carried on a clamping body that has a narrow waist that is slidably mounted between a pair of opposed retaining flanges on the channel to adjust the position of the clamping plate relative to the conveyor skirt plate.

14 Claims, 8 Drawing Sheets

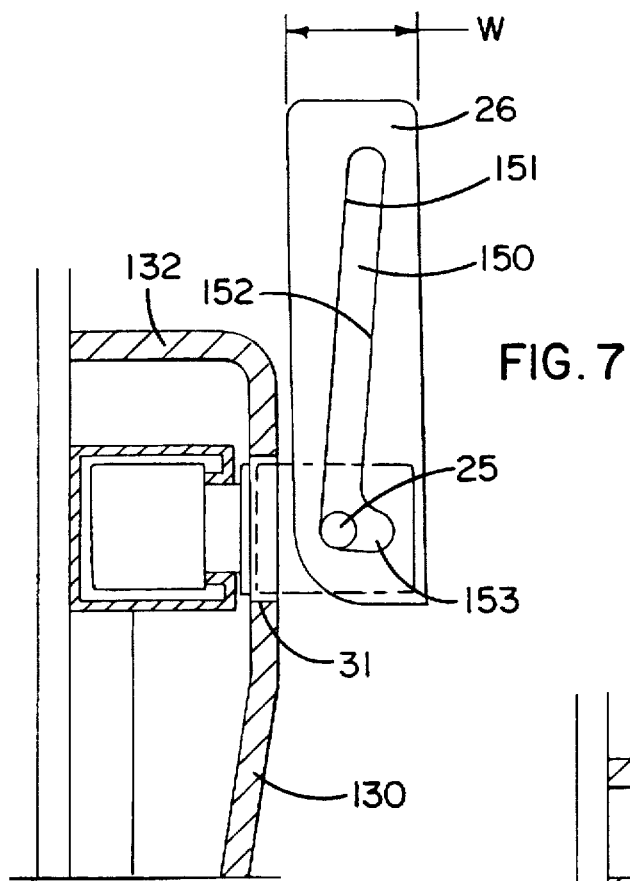
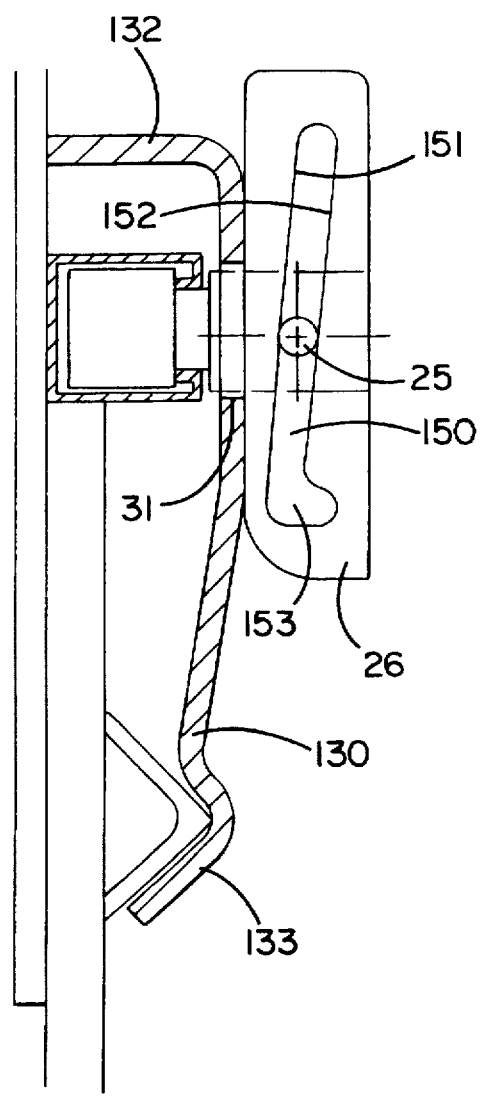

5,774,951

1

CLAMP

FIELD OF THE INVENTION

This invention relates to clamps and more specifically to clamping devices for securing skirts to skirt plates in position along the edge zones of a conveyor belt.

BACKGROUND OF THE INVENTION

It is well-known, particularly with so-called volume conveyor belts in mining, to provide upright wear plates above the usually-upturned side strips of the belt. Such plates act as guides or doctors to contain the flow of, for example, coal which is being conveyed. The wear plates terminate a short distance above the belt and, to counter the inevitable migration of smaller coal particles, it is also known to provide outer skirt plates which are mounted on the wear plates and carry usually resilient skirts to more-or-less engage the (moving) conveyor belt near its outer edges. Particularly in cases where high volume flow is not required and/or when the material conveyed is not very abrasive, wear plates may not be necessary and all the necessary containment can be effected by skirt plates and skirts. One problem associated with conveyor belt skirts which, acting almost as scrapers, require periodic adjustment and/or replacement, lies in the difficulty of removable attachment to the skirt plates. Various clamping systems have been employed, but none has been very satisfactory for reasons including high cost, complexity and the inclusion of separable parts such as wedges which, if not tethered, can readily be lost in the often dimly-lit and usually hazardous environment of a mine gallery.

OBJECTS AND SUMMARY OF THE INVENTION

In accordance with the present invention, a flexible skirt may be releasably and adjustably clamped to a conveyor skirt plate by driving a locking member with a hammer to cause an inclined ramp surface in an elongated slot in the locking member to slide along a stationary pin of a clamp body. As the locking member slides along the pin in the clamping direction, it exerts a force on a clamp plate that has an abutment surface abutting the skirt and exerting a clamping force to clamp the flexible skirt against the skirt plate. To release the clamping force in order to adjust the position of the skirt relative to the conveyor belt, the locking member is driven in the opposite direction with the ramp surface sliding along the pin and decreasing the force applied by the locking member to clamp member and from the clamp member to the flexible skirt.

Preferably, the position of the clamp member, the clamp body and the locking member may be shifted longitudinally along skirt plate to exert a clamping force at different locations longitudinally with respect to the conveyor belt. To this end, a channel is mounted on the skirt plate above the flexible skirt, the clamp body, and blocking member are slidable along the channel when the locking member is in its release position. Preferably, the clamping member has a bore in its large enough to permit the locking member to pass therethrough when the clamp member is pivoted to a position at right angles to the clamping plate. Thus, the clamping member may be removed for installing or when replacing a flexible skirt. The pin retains the locking member on the clamping body because the pin is in the elongated slot which is a closed slot. Thus, the locking member will not be separated from the clamping body and become lost.

BRIEF DESCRIPTION OF THE DRAWINGS

Embodiments of the present invention will now be described, by way of example, with reference to the accompanying drawings in which:

2

Figure 1:
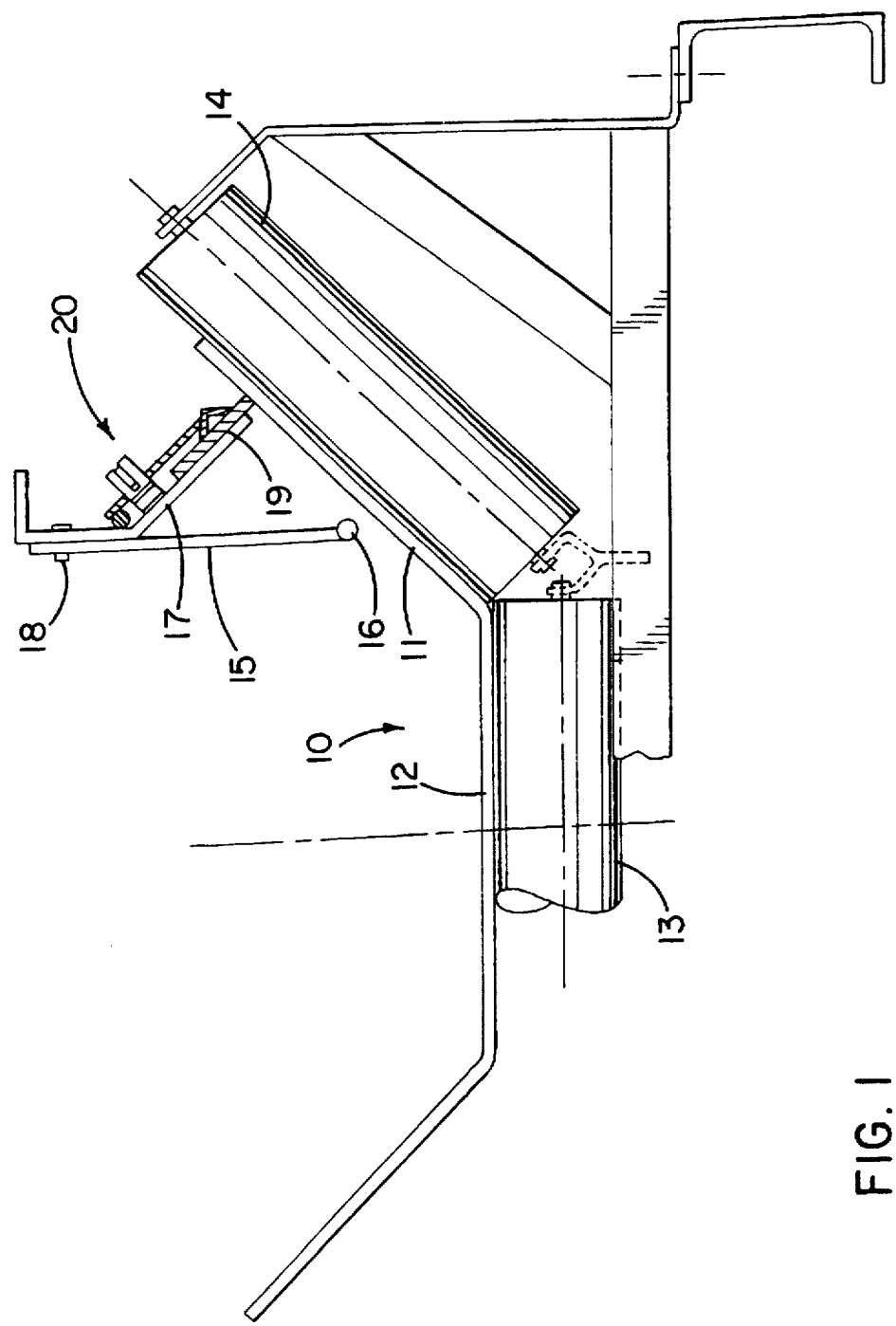
Figure 2:
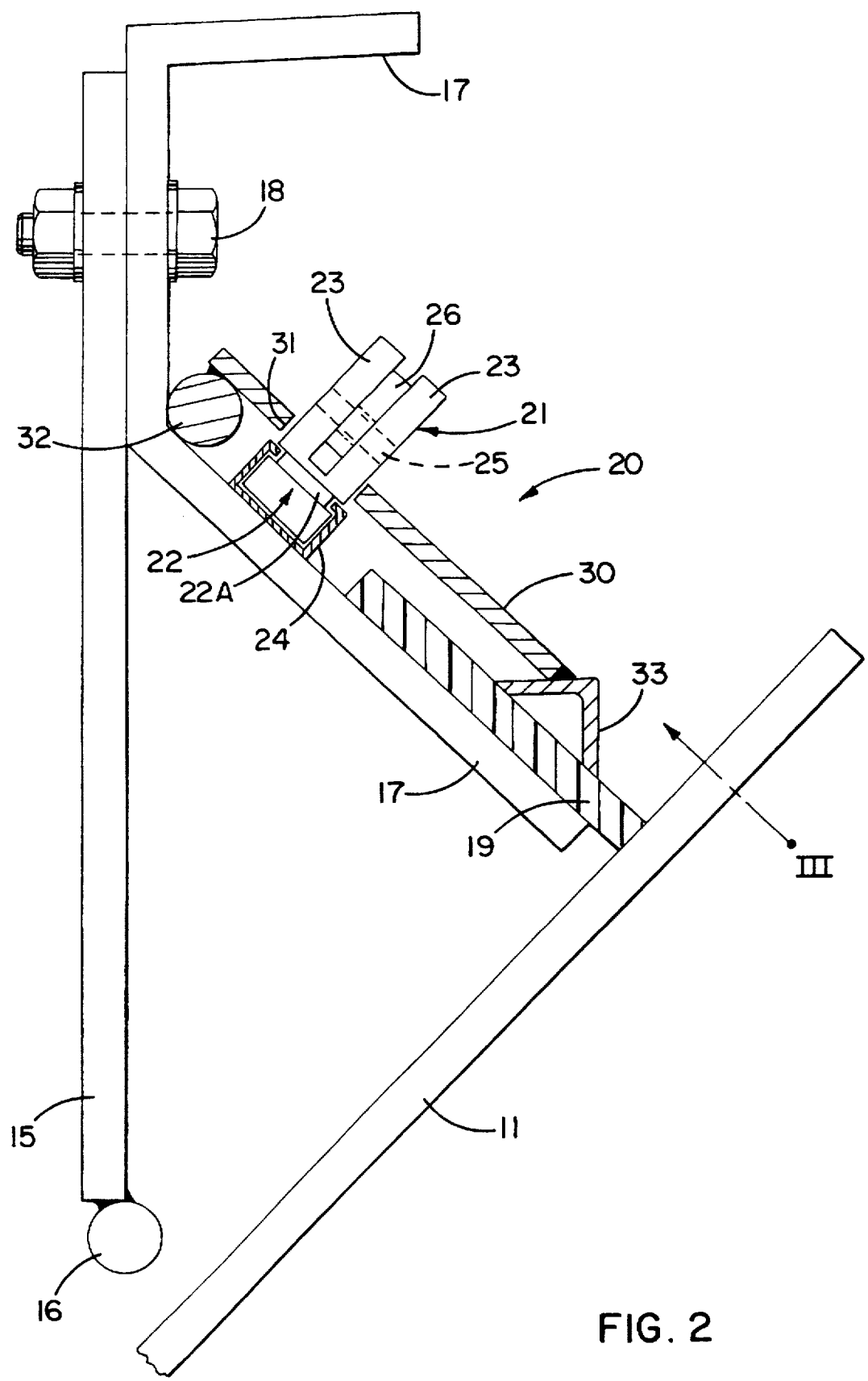
Figure 3:
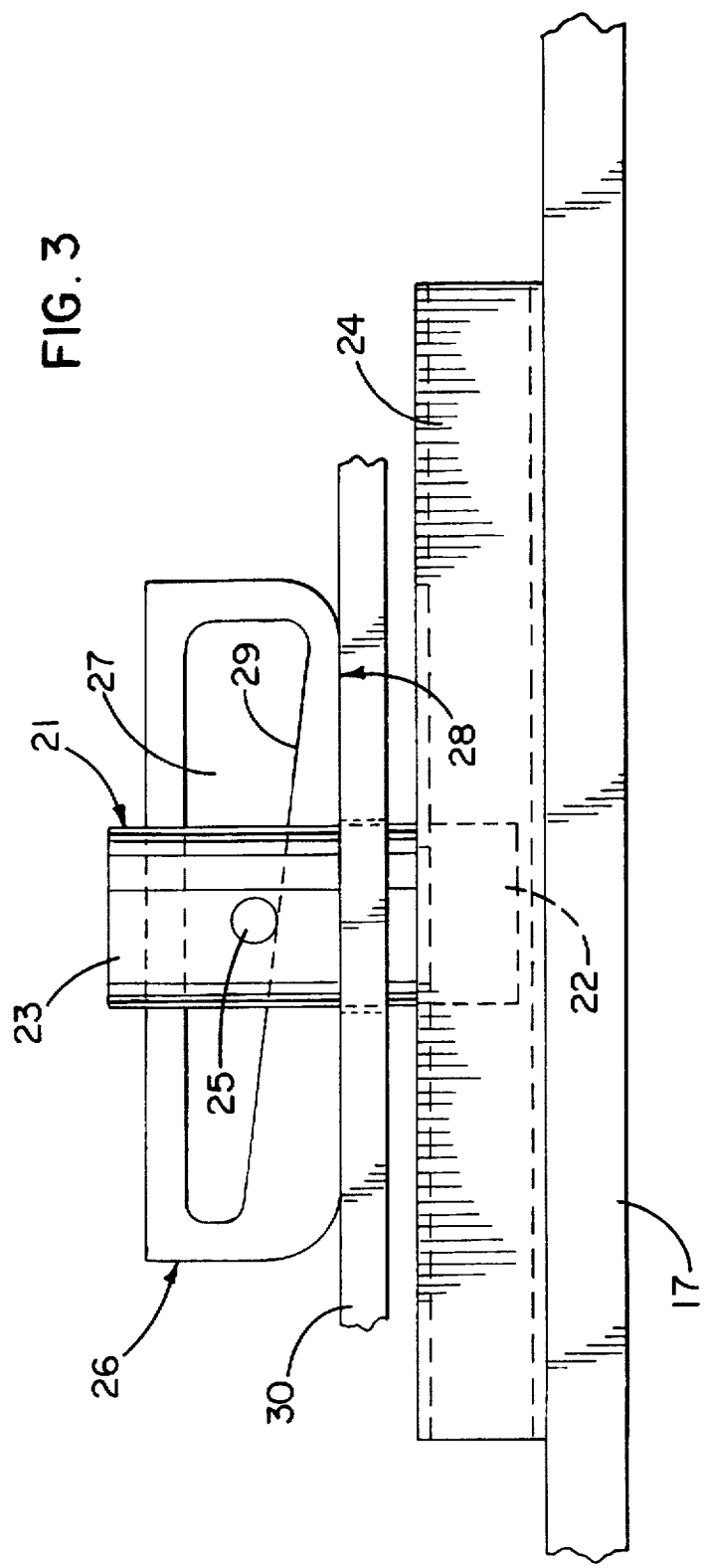
Figure 4:
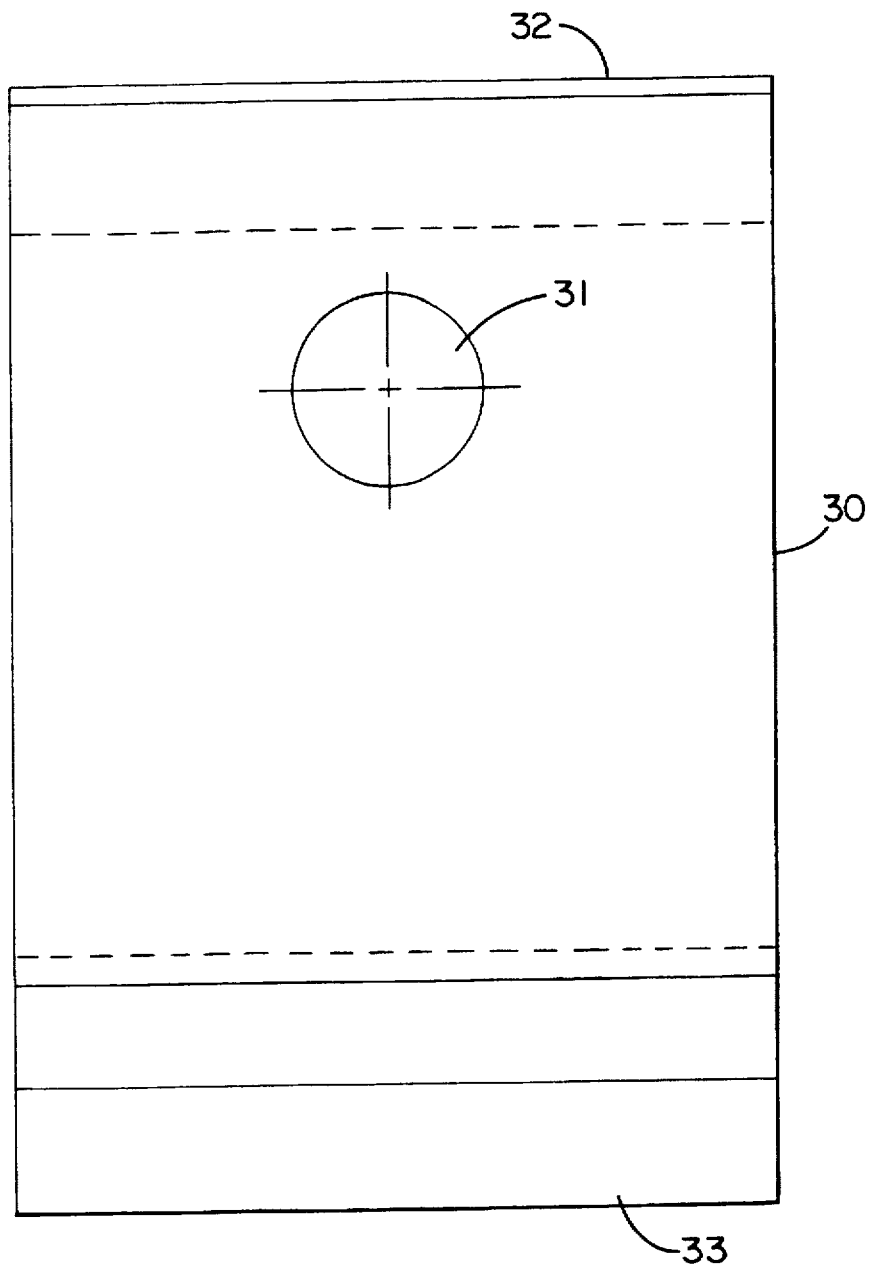
Figure 5:
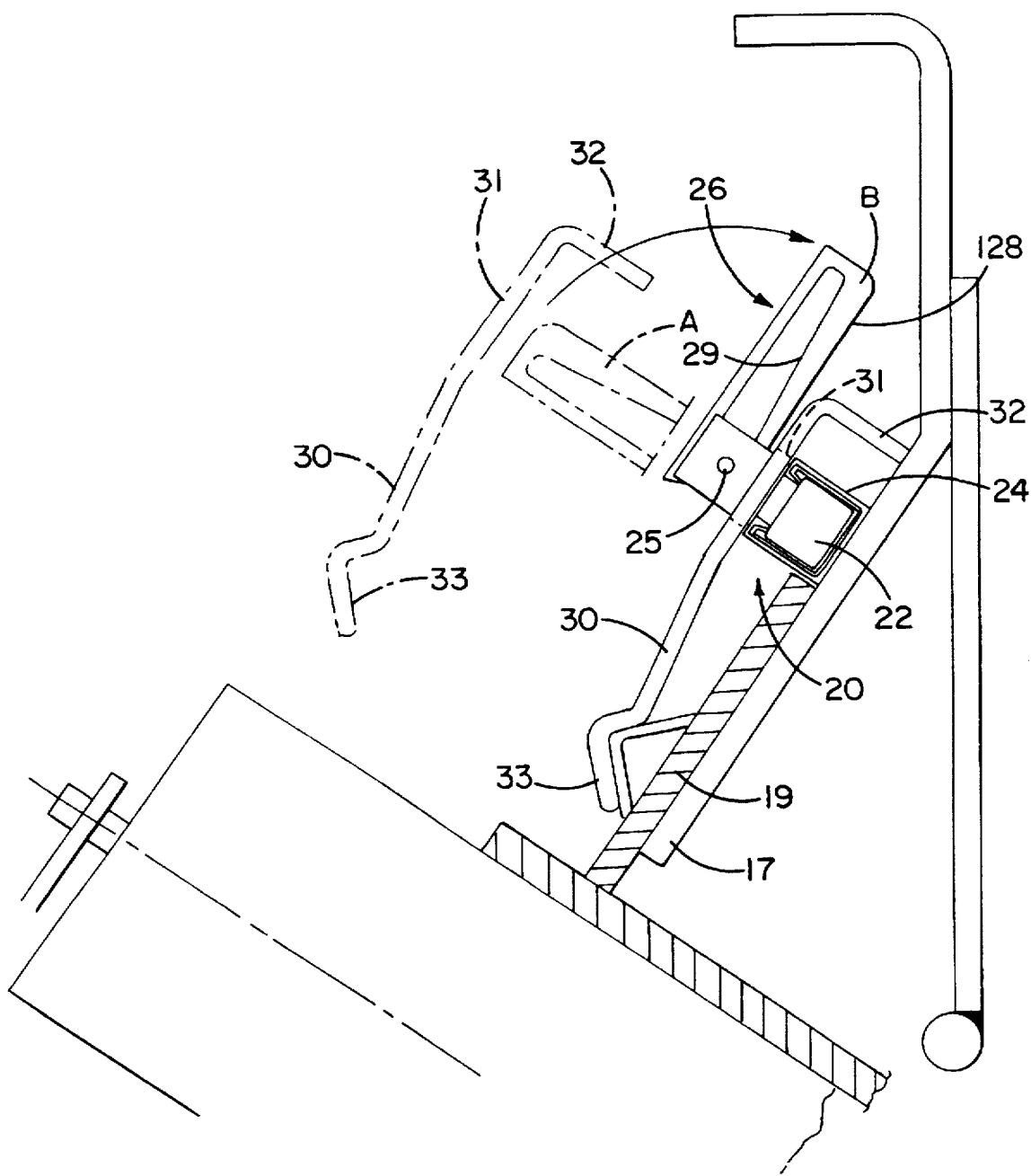
Figure 6:
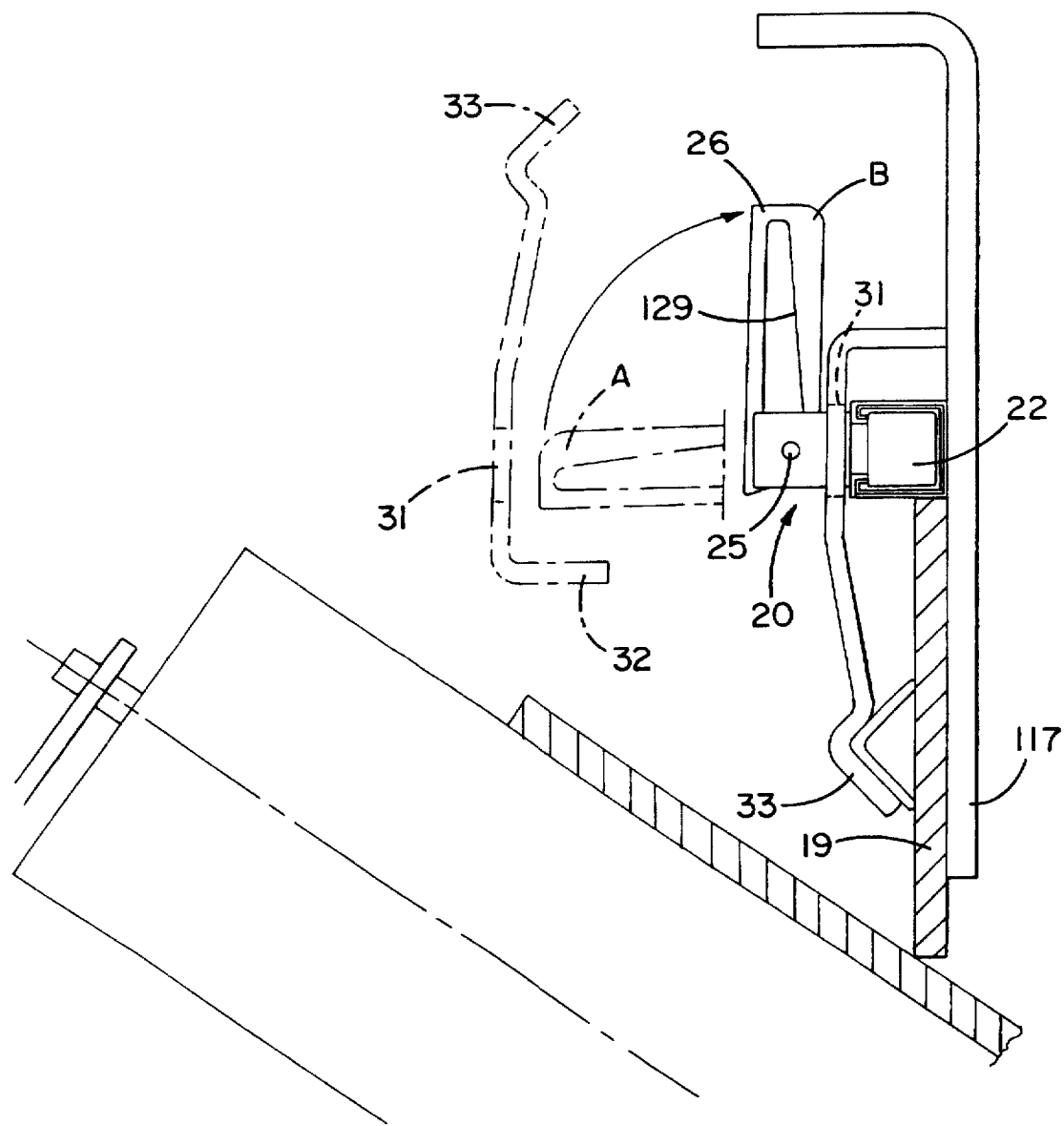
Figure 9:
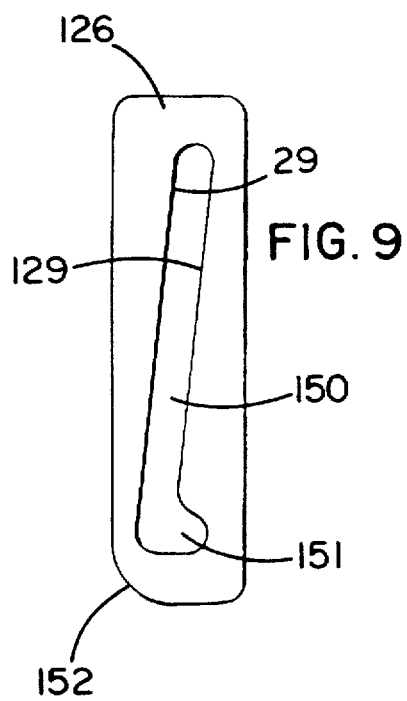
Figure 10:
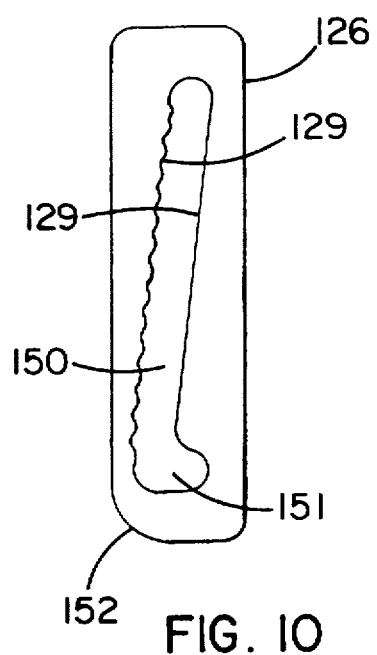

FIG. 1 is a half sectional view of a conveyor belt system incorporating wear plates and also skirt plates and skirts clamped in accordance with the invention;

FIG. 2 is a fragmentary view on a larger scale, of the system shown in FIG. 1;

FIG. 3 is a side elevation of a clamp;

FIG. 4 is a plan view of one type of clamp plate;

FIG. 5 is a side elevation, partially sectioned of a clamp as used in a right angle relation to a conveyor belt;

FIG. 6 is a side elevation, partially sectioned, of a clamp used vertically with a conveyor belt;

FIG. 7 and 8 show a clamp in a released and clamped position;

FIG. 9 and 10 show two styles of closed loop cotters; and

Figure 11:
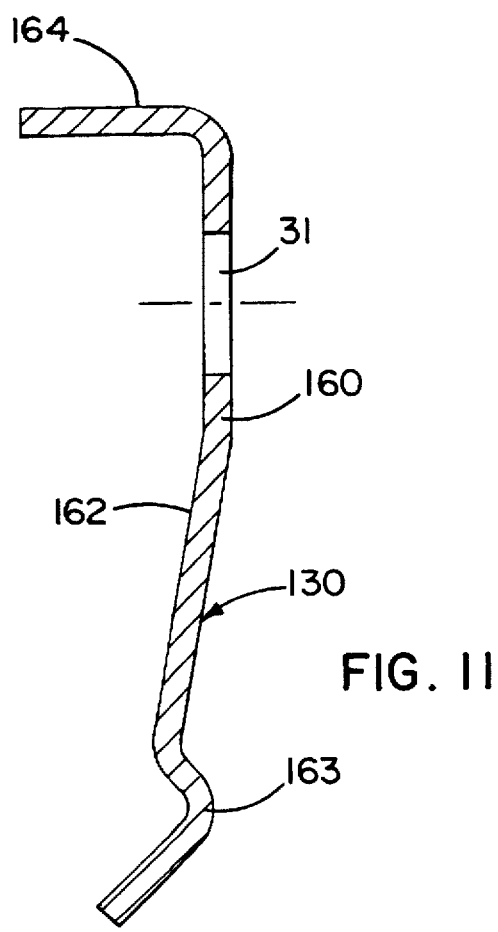

FIG. 11 shows an end view of a one piece clamp plate.

BEST MODE AN OTHER EMBODIMENTS OF THE INVENTION

A clamp of the present invention may be used in a variety of applications. For example, referring to FIG. 1 of the drawings, a conveyor belt 10 is of conventional trough-section form having upturned side zones 11 extending outwardly from a generally flat central zone 12. Central rollers 13 support zone 12 of the belt, and outer idler rollers 14 support the zones 11. Mounted on a frame extending along the conveyor belt, are upright wear plates 15 of steel which terminate at their lower ends in welded beads 16 spaced a short distance above the adjacent belt zone 11. A profiled steel skirt plate 17 is bolted (at 18) to each wear plate 15 at intervals along its length, to lie at right angles to the adjacent zone 11 of the belt, and a robust rubber skirt 19 is clamped to the plate 17 by a series of clamping devices 20 according to the present invention.

As more clearly illustrated in FIGS. 2 and 3, a clamping device 20 includes a generally cylindrical body member 21 comprising a circular waisted base 22 and a pair of lugs 23 which extend upwardly from and continue the outer cylindrical form of the base. The member 21 is dimensioned so that the base enters one of a series of open-ended channel-shaped runners 24, of standard section if desired, welded intermittently along the skirt plate 17 with opposed, inwardly extending flanges on the channel walls which enter the waist 22A. Each of the clamping devices 20 may be slid within the channel to shift longitudinally with respect to the skirt plate 17 and the conveyor belt. The clamping devices may be attached to the skirt plate in other manners. A pin 25 is secured between the spaced lugs 23, and an elongate locking member or captive cotter 26 according to the invention is attached by means of the pin 25 which passes through central opening 27 in the member 26; the attachment is permanent until such time as the pin 25 may be intentionally extracted.

As best shown in FIG. 3, the member 26 defines a closed uninterrupted loop and is formed as an elongate steel plate having a central opening 27 shaped to provide, in conjunction with the lower elongate face 28 of the member, at least one ramp-like surface 29 for engagement with the pin 25. As shown in FIGS. 9 and 10 each member 126 may have two ramp like surfaces 29, 129. With reference to FIG. 10, locking member 126 has a ramp-like surface 129 formed with a series of shallow recesses or undulations to minimise the danger of disengagement with the pin 25.

The other component of the device 20 is clamp plate 30 which is illustrated also in FIGS. 4 and 11. In the example of FIG. 4 and FIG. 2, the rectangular plate 30 is formed of steel, with a circular through-opening 31 and has welded at one end an abutment bar 32 and at the other end an abutment 33 in the form of a length of angle iron. In the example of FIG. 11, the abutment surfaces are integrally formed and not welded on.

As shown in FIG. 5, where the clamp 20 is used with a skirt which is perpendicular to a conveyor surface, the base 22 of the body member of each of the number of devices 20 required is passed through the opening or bore 31 in its clamp plate 30, and entered into the appropriate runner 24 and slid along to any required position. Alternatively, the body member 21 is first fitted in the channel and the clamp plate is then placed over the body member which can pass freely through the opening 31. The rubber skirt 19 is then correctly positioned against the skirt plate 117 (17) and clamped in position as follows: each locking member is shifted from the position A (FIG. 5) which has allowed passage through the plate opening 31, to position 8 and then turned through 90° where the bottom face 128 lies against the clamp plate 30, and the locking plate 26 is hammered or otherwise driven to the position shown in FIG. 3. When driven, the ramp face 129 (29) engages the anchored pin 25 to urge the clamp plate and thus its abutments downwardly so that the abutment 32 firmly engages the skirt 19, locking the skirt in position against the plate.

As shown in FIG. 6, the clamp 20 may be used in a vertical orientation with the skirt 19 contacting the belt at an angle.

The clamping operation is shown in more detail in FIGS. 7 and 8. Note that the locking member 26 comprises a closed loop having a central opening 150 which defines two inner ramped surfaces 151, 152. The width W of the locking member is narrow enough to pass through the bore 31 of whatever type or style of clamp plate is used. The central opening 150 of the locking member also may include a widened end 153 to facilitate rotating and positioning the member when the pin 25 is located through that end. Note that with the clamp plate 130 shown in FIGS. 7 and 8, the abutment 132 is integral and bent about 90° with respect to the portion of the clamp plate against which the locking member 26 bears.

FIGS. 9 and 10 show two styles of locking member 126. Both include a diagonal central opening 150 which defines two ramp surfaces 29, 129 and an enlarged end 151 of the opening 150. One corner 152 is rounded near the enlarged end 151. This feature allows the locking member 126 to pivot more easily.

FIG. 11 shows a cross-section of a clamping plate 130 formed integrally from a single steel plate. The plate 130 further comprises a flat portion 160 against which an outer surface of a locking pin bears. The flat portion 160 has a bore 31 through which may pass through both the body member 21 of the device 20 and the locking member 26. One end of the plate 30 is an abutment 161 which is bent about 90° with respect to the flat portion 160. The other end 163 abuts the skirt and may have a variety of configurations. In the example shown, the skirt clamping abutment 163 is roughly L-shaped in cross-section and is formed at the end of a ramp 164 which extends from the flat portion 160 to the skirt clamping abutment 162.

The clamping devices described above, according to the invention, have proved extremely satisfactory in use, not only as regards their clamping function but also as regards ease of use and absence of accidental loss of parts. Further, the devices are of simple, reliable construction and are relatively inexpensive to produce.

Modifications may be made without departing from the scope of the invention. For example, the bar (32) or an equivalent abutment may be welded to the skirt plate rather than to the clamp plate. Also, a broad rib or other abutment may be formed along the skirt and so avoid the requirement for the abutment 33. Such modifications would simplify the (removable) clamping devices. Furthermore, instead of being of circular section, the body members (21) may be of square or other rectangular section, to pass through square or like openings (31) in the plates 30. In this case, the locking member (29/129) could not swivel 360° as in the above examples, but the square-section member (21) would have the advantage of not requiring the milling of a full recess (22A) and, indeed, a shoulder may suffice for engagement with the flanges of the channel-shaped runners 24.

INDUSTRIAL APPLICATION

The invention has many industrial applications where metal parts must be removably clamped together. Two concrete examples are illustrated in FIGS. 5 and 6, for example, with respect to conveyor belt skirt clamping.

We claim:

1. A clamping apparatus for clamping a flexible skirt to a skirt plate along an edge of a conveyor belt, said clamping apparatus comprising:

a clamp body mounted on the skirt plate and projecting outwardly therefrom.

a locking member formed with an elongated slot therein and having a cam surface thereon;

a cam means on the clamp body having a camming engagement with the cam surface on the locking member and protecting through the elongated slot and allowing the locking member to pivot between a release position and a locking position:

a clamp member operable by the locking member to move to increase or decrease the clamping force to hold the flexible skirt against the skirt plate: and a force applying portion on the clamping member for exerting the clamping force on flexible skirt to clamp the flexible member against the skirt plate;

a channel-shaped runner being secured to the skirt plate and slidably receiving the clamp body for sliding movement in the runner to adjust the location of the clamp body and the locking member and clamp member carried by the clamp body relative to the skirt plate.

2. A clamping apparatus in accordance with claim 1 wherein the cam means comprises a pivot pin projecting through the elongated slot and retaining the locking member on the clamp body, the locking member comprises a plate having the cam surface thereon in the form of an inclined ramp surface on one side of the elongated slot for camming engagement with the pivot pin to exert the clamping force on the clamp member.

3. A clamping apparatus for securing flexible skirting material to a skirt plate along edge zones of a conveyor belt, comprising:

a clamp body portion including two spaced-apart lugs;

a locking member located between said lugs and formed with an elongated slot therein, and defining at least one ramp surface;

a pin extending between said lugs and through the elongated slot of said locking member and having camming engagement with the ramp surface;

a clamp plate having a bore to pass said clamp body and locking member therethrough, the locking member being positioned so as to be axially movable relative to said skirt plate and said clamp plate, and between the lugs of said clamp body, so as to releasably exert pressure on said clamp plate;

said clamp body and locking member being passed through the bore in said clamp plate, so as to locate said clamp plate in juxtaposition with said skirt plate;

abutment means provided on an underside of said clamp plate for exerting a clamping force on the clamp plate to releasably and adjustable locate said flexible skirting material relative to said skirt plate and said edge zones of said conveyor belt; and an elongated channel-shaped runner fixed to the skirt plate and having opposed inwardly extending flanges defining a longitudinal opening therebetween; said clamp body further comprising a waist portion; the inwardly extending flanges being adapted to engage the waist portion of the clamp body, thus allowing the clamp body to slide in the opening along the runner.

4. A clamping apparatus as claimed in claim 3, wherein the clamp body portion is cylindrical and has a waist extending completely around the body.

5. A clamping apparatus as claimed in claim 3, wherein the locking member is in the form of a closed, uninterrupted loop.

6. A clamping apparatus as claimed in claim 3, wherein the clamp plate is in the form of an integral construction.

7. A clamping apparatus as claimed in claim 3, wherein one ramp surface of the locking member is formed with a series of shallow recesses for engaging said pin.

8. A clamping apparatus as claimed in claim 3, wherein the elongated slot of the locking member includes an enlarged portion; one external corner of the locking member being rounded.

9. A clamping apparatus as claimed in claim 3, wherein the elongated slot in said locking member defines two ramp surfaces.

10. In a conveyor having a support plate extending adjacent a conveyor belt, the combination comprising:

a movable skirt mounted on the support plate and having an upper edge and a lower edge, which is positioned at the conveyor belt to retain material on the conveyor belt;

the skirt being shiftable downwardly after its lower edge has been worn away;

a clamping device for releasably clamping a portion of the movable skirt to the support plate and movable to a release position to allow downward movement of the movable skirt when its lower edge is worn;

an elongated locking member pivotally mounted on the clamping device for pivoting between an upstanding position and a locking position;

a clamping member on the clamping device having an opening for aligning with the elongated locking member and for allowing the elongated member to pass through the opening when the locking member is in its upstanding position;

a face on the elongated locking member for lying against the clamping body when pivoted into its locking position;

a driving portion on the elongated locking member to be struck and driven to slide the face of the locking member along the clamping body;

camming surfaces on the clamping device and locking member to force the face of the locking member tightly against the clamping member; and a clamping end on the clamping member for engaging the movable skirt and for releasably clamping the portion of the movable skirt to the support plate in its adjusted position when the driving portion has driven the locking member to its locking position.

11. The combination of claim 10 wherein the skirt is made of a flexible material;

the clamping body has an upper end in engagement with the support plate above the upper edge of the movable skirt;

a central portion with the opening therein to receive the upstanding locking member; and a lower portion having the clamping end thereon.

12. The combination of claim 11 wherein the upper end projects inwardly from the central portion of the clamping member to engage the support plate above the upper edge of the skirt; and the clamping end on the lower portion of the clamping member projects inwardly from the central portion to clamp the skirt.

13. The combination of claim 11 wherein an elongated support is fastened to the conveyor, and the clamping device is slidably mounted on the elongated support to be shifted laterally along the support to different locations to clamp the movable skirt at different locations.

14. The combination of claim 13 wherein:

the elongated support is a channel-shaped member with opposed, inwardly-extending flanges; and the clamping device has a waist portion engaging the inwardly-extending flanges to retain the clamping device on the channel member.

* * * * *

UNITED STATES PATENT AND TRADEMARK OFFICE
CERTIFICATE OF CORRECTION

PATENT NO. : 5,774,951
DATED : July 7, 1998
INVENTOR(S) : Close, et al.

It is certified that error appears in the above-indentified patent and that said Letters Patent is hereby corrected as shown below:

Column 4, line 28, change "," to --;--.

Column 4, line 33, change "protecting" to --projecting--.

Column 4, line 35, change ":" to --;--.

Column 4, line 38, change ":" to --;--.

Column 5, line 11, change "adjustable" to --adjustably--.

Signed and Sealed this

Eighth Day of December, 1998

Attest:

BRUCE LEHMAN

*Attesting Officer*  *Commissioner of Patents and Trademarks*